United States Patent
Plaquin et al.

(10) Patent No.: US 11,449,618 B2
(45) Date of Patent: Sep. 20, 2022

(54) ACTIVE TESTING OF ACCESS CONTROL POLICY

(71) Applicant: Hewlett-Packard Development Company, L.P., Spring, TX (US)

(72) Inventors: David Plaquin, Bristol (GB); Christopher Ian Dalton, Bristol (GB); Ronny Chevalier, Meudon (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,030

(22) PCT Filed: Aug. 6, 2019

(86) PCT No.: PCT/US2019/045276
§ 371 (c)(1),
(2) Date: Oct. 12, 2020

(87) PCT Pub. No.: WO2020/040983
PCT Pub. Date: Feb. 27, 2020

(65) Prior Publication Data
US 2021/0192055 A1 Jun. 24, 2021

(30) Foreign Application Priority Data
Aug. 24, 2018 (EP) ..................................... 18290094

(51) Int. Cl.
*G06F 21/00* (2013.01)
*G06F 21/57* (2013.01)
*G06F 21/54* (2013.01)
(52) U.S. Cl.
CPC ............ *G06F 21/577* (2013.01); *G06F 21/54* (2013.01)

(58) Field of Classification Search
None
See application file for complete search history.

(56) References Cited

U.S. PATENT DOCUMENTS

| | | | |
|---|---|---|---|
| 7,002,943 B2 | 2/2006 | Bhagwat | |
| 7,685,165 B2 | 3/2010 | Gopisetty | |
| 8,467,312 B2 | 6/2013 | Raleigh | |
| 9,824,216 B1* | 11/2017 | Khalid | G06F 21/554 |

(Continued)

OTHER PUBLICATIONS

Agrawal, Hira et al. Preventing insider malware threats using program analysis techniques. 2010—Milcom 2010 Military Communications Conference. https://ieeexplore.ieee.org/stamp/stamp.jsp?tp=&arnumber=5679584 (Year: 2010).*

Zhu, Jun et al. A Runtime-Monitoring-Based Dependable Software Construction Method. 2008 The 9th International Conference for Young Computer Scientists. https://ieeexplore.ieee.org/stamp/stamp.jsp?tp=&arnumber=4709127 (Year: 2008).*

(Continued)

*Primary Examiner* — Jeremiah Lavery
(74) *Attorney, Agent, or Firm* — HP Inc. Patent Department

(57) ABSTRACT

A method is provided, comprising actively testing the access control policy of a software target using a probing logic. The method further comprises determining whether an intrusion in the software target has occurred based on monitored side effects. According to the method, the probing logic is to execute at least one operation that is forbidden by the access control policy. The probing logic is further to create at least one predetermined observable side effect based on the successful execution of the operation.

15 Claims, 5 Drawing Sheets

(56) References Cited

U.S. PATENT DOCUMENTS

| | | |
|---|---|---|
| 10,929,266 B1 * | 2/2021 | Goradia .............. G06F 21/566 |
| 2004/0243881 A1 | 12/2004 | Wang |
| 2005/0177746 A1 | 8/2005 | Bunn |
| 2007/0192863 A1 * | 8/2007 | Kapoor .................. H04L 9/40 |
| | | 726/23 |
| 2008/0262990 A1 * | 10/2008 | Kapoor .................. H04L 9/40 |
| | | 706/20 |
| 2013/0125199 A1 * | 5/2013 | Novak .................. G06Q 50/26 |
| | | 726/1 |
| 2014/0259095 A1 | 9/2014 | Bryant |
| 2015/0033031 A1 | 1/2015 | Swaminathan |
| 2016/0055026 A1 * | 2/2016 | Fitzgerald .......... H04L 63/1433 |
| | | 718/1 |
| 2017/0163688 A1 | 6/2017 | Ross |
| 2018/0211046 A1 * | 7/2018 | Muttik .............. G06F 9/30058 |
| 2018/0218145 A1 | 8/2018 | Hussain |
| 2019/0042734 A1 * | 2/2019 | Kounavis .............. G06F 21/54 |

OTHER PUBLICATIONS

Stoica, Adrian; Katkoori, Srinivas. "Glitch Logic" and Applications to Computing and Information Security. 2009 Symposium on Bio-inspired Learning and Intelligent Systems for Security. https://ieeexplore.ieee.org/stamp/stamp.jsp?tp=&arnumber=5376815 (Year: 2009).*

Seamons, Kent E. et al. "Requirements for Policy Languages for Trust Negotiation" (2002), IEEE Computer Society, Proc of the 3rd Int'l Workshop on Policies for Distributed Systems and Networks (Policy '02), 12 pages.

* cited by examiner

ACTIVE TESTING OF ACCESS CONTROL POLICY

BACKGROUND

Intrusion Detection Systems (IDS) focus on observing the behavior of a software target. In particular, an external monitor may be able to observe and analyze the behavior of the software target in order to determine whether its access control policy has been compromised. This may be performed either directly, e.g. through memory scanning, or indirectly, e.g. through observing network and disk activity.

An intrusion of a software target may compromise its access control policy, for example by attack tools. An intrusion may be an unauthorized or malicious use of the software target or its execution environment. A successful intrusion might give an intruder access to a computer or a computer network, or enable the attacker to tamper with the software target, e.g. to access programs, proprietary or sensitive data, launch a program or introduce malicious software or the like.

BRIEF DESCRIPTION OF THE DRAWINGS

Features of examples will be described, by way of example only, in the following detailed description with reference to the accompanying drawings in which similar reference numerals correspond to similar, though perhaps not identical, components. For the sake of brevity, reference numerals or features having a previously described function may or may not be described in connection with other drawings in which they appear.

DETAILED DESCRIPTION

Figure 1:
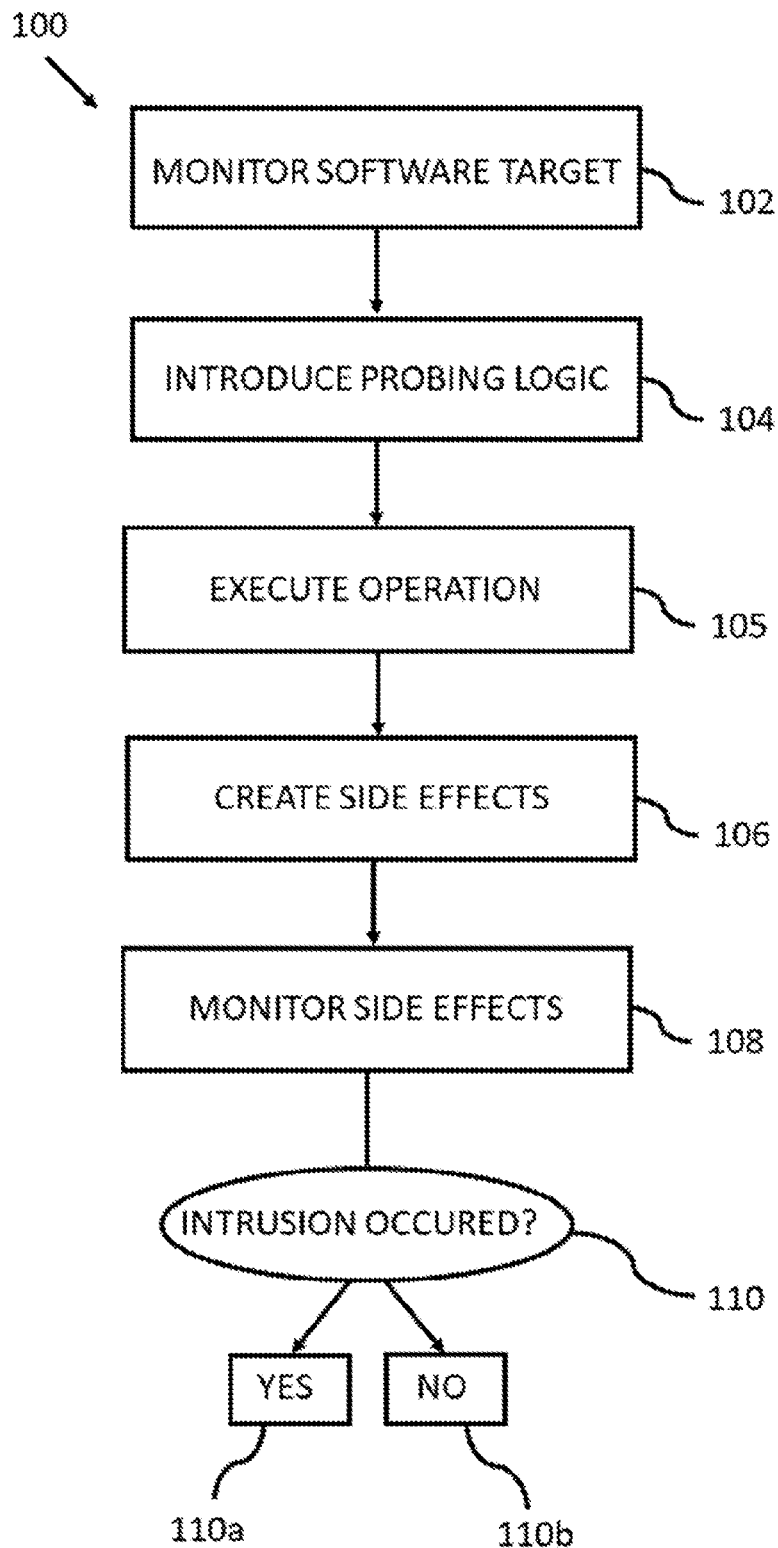
FIG. 1 is a block diagram of an example method for actively testing an access control policy.

Examples provided herein include methods and systems for actively testing an access control policy. Systems for actively testing an access control policy may be referred to as Intrusion Detection Systems (IDS). Example systems described herein may correspond to computer systems or network systems. An example Intrusion Detection System may monitor compromise of software targets. A software target may refer to an application, a system, a firmware, etc. As used herein, the terms software, firmware, program, application, code or the like may refer to any kind of machine readable instructions.

An example Intrusion Detection System may monitor software targets by introducing an active probing component, e.g. a probing logic, to validate the integrity of the access control mechanisms of the software targets and their policies. Some example Intrusion Detection Systems may use an external monitor. Some other example Intrusion Detection Systems may comprise a monitor.

An objective of an example intruder may be to elevate the privileges given to the compromised software target, such as an application, in order to compromise other parts of the system. This is referred to as privilege escalation. A further objective of the example intruder may be to use the elevated privileges to get access to data it normally does not have access to.

In some examples, a method may comprise monitoring a software target having an access control policy. The example method may further comprise introducing a probing logic into the software target. The probing logic may be to actively test the access control policy. The probing logic may be to execute at least one operation that is forbidden by the access control policy, and to create at least one predetermined observable side effect based on the successful execution of the operation. The example method may further comprise determining whether an intrusion in the software target has occurred based on monitored side effects.

In some examples, a system may comprise a software target having an access control policy. The example system may further comprise a monitor having a monitoring policy. The example system may further comprise a probing logic to actively test the access control policy. The probing logic may be to execute at least one operation that is forbidden by the access control policy, and to create at least one predetermined observable side effect based on the successful execution of the operation. The example system may further be to determine whether an intrusion in the software target has occurred based on the monitored side effects.

Monitoring the software target may comprise observing and analyzing the behavior of the software target. However, actively testing the access control policy of a software target may, for instance, further comprise creating well defined, i.e. predetermined, observable side effects and monitoring them. Since the side effects are predetermined, i.e. known in advance, it is known in advance what side effects the monitor should be looking for. This eliminates the need to understand complex applications or complex intrusion vectors.

In some examples, the probing logic may create one predetermined observable side effect based on the successful execution of the forbidden operation. In some examples, however, the probing logic may create a number of predetermined observable side effects based on the successful execution of the forbidden operation. For example, the probing logic may create a number of different predetermined observable side effects.

In some examples, the software target may be a main logic, i.e. the potentially vulnerable code or software. In general, the term logic as used herein refers to any kind of code or software, i.e. any kind of machine readable instructions. In some examples, the software target may be an execution environment of the main logic. In some examples, the software target may be both an execution environment and a main logic. For example, a successful intruder may alter the main logic, the execution environment, or both.

The main logic may be a software with a potentially unknown vulnerability. For example, the main logic may be running in an isolated execution environment.

An example system may further comprise a configurable access control mechanism (e.g. a MAC). The access control mechanism may remain immutable for the duration of the execution of the main logic and its execution environment, for instance.

The access control policy may be subjected to the configurable access control mechanism, e.g. the MAC. The access control policy may specify the configuration of the access control mechanisms that the main logic and its execution environment are subjected to. For example, an access control policy may constitute in that a file or directory can not be read, written to, or executed. In some examples, a system call may not be executable. In some examples, an IP address, a protocol, or a port may not be usable. In some examples, a memory region may not be accessible.

An example probing logic which has been introduced into the software target may try to execute operations that are forbidden by a properly configured and enforcing access control mechanism. Successful execution of such operations may create an observable side effect. For example, if the system is not compromised, the probing logic requests may result in failure and no side effects may be detected. In some examples, if the system is not compromised, the probing logic requests may send a failure report which may be detected as a side effect.

In some examples, a compromise of the main logic may result in a change in the access control policy. For example, the access control policy itself may be changed. As another example, some of the enforcement logic may be compromised. For example, the compromising logic may gain certain privileges regarding the access control mechanisms. The probing logic, which is part of the same execution environment, may be subjected to the same access control mechanisms. The probing logic may also gain such privileges. In these cases, the probing logic requests will no longer fail and will produce a side effect observable by the monitor.

The integrity of the access control mechanisms of a system may be monitored by actively verifying that its current policy enforcement is conform with the originally intended policy. This may be performed continuously, for instance.

Verifying or validating that a current policy enforcement is in conformity, or detecting a non-conforming policy, for example, is easier than detecting an abnormal behavior of a software target.

In some examples, the execution environment may be a virtual machine (VM), a container, a process, etc.

In some examples, the probing logic is to create a number of predetermined side effects. The predetermined side effects may comprise at least one of accessing a file or directory, creating a file, deleting a specific piece of data or code in the software target or in another execution environment, creating network traffic, executing a system call, or blocking one of an IP address, a protocol or a port.

As an example, a specific file or directory may be created or written to. The specific file or directory may be in another execution environment.

As an example, the probing logic's memory may not contain a specific piece of data originally stored in another execution environment.

As an example, the parent execution environment may not contain a specific injected code, or a specific memory area of another execution environment may not contain a specific value.

As an example, the probing logic may report success or failure of the probing operations.

In some examples, a monitoring policy may specify the at least one observable side effect. The at least one side effect may be observed for each successful probing operation.

For example, varying the configuration parameters for the side effects between various logic and execution environment may facilitate the determination of where the compromise occurred, e.g. which application was compromised. Moreover, the monitor may be able to report on the impact of the vulnerability, which may be inferred from the list of successful probing operations. This may facilitate the characterization of the type of compromise.

In some examples, the monitoring policy may further specify at least one responsive action to take when it is determined that an intrusion has occurred.

In some examples, the system may further comprise a probing policy.

In some examples, the probing policy may specify the at least one operation that is to be executed by the probing logic.

The probing policy may be inferred from the access control policy. The operations specified in the probing policy may be executed in order to actively test the access control configuration. In some examples, the probing policy may be inferred by an automated process. In some examples, the probing policy may be designed by hand.

In some examples, the probing logic may try to execute the operations specified in the probing policy. In some examples, the probing logic may interpret the probing policy. In some examples, the probing logic may be generated from the probing policy. The probing logic may also be a separate entity within the same environment of the main logic, such as, e.g. another process in a container, or another thread in a process, etc. The probing logic may also be part of the main logic (e.g. added by an instrumentation stage during compilation).

In some examples, the monitor may observe any side effect specified in the monitoring policy. Additionally, in some examples, the monitoring policy may also specify the actions (event, response, etc.) to take when the side effect is detected.

In some examples, the monitor may monitor the integrity of the probing logic and ensure it is executed regularly. Thus, there may be a small and well-known code, e.g. the probing logic, to monitor for ensuring the correct behavior thereof.

In some examples, the monitor may interact directly with the probing logic to pass messages such as report of success/failure of probing operations, new configuration parameters for the side effects, etc.

In some examples, a non-transitory program product may have computer readable code stored thereon that, when executed by a computing device, may cause the computing device to monitor a software target having an access control policy, introduce a probing logic into the software target to actively test the access control policy, and to determine whether an intrusion in the software target has occurred based on monitored side effects, wherein the probing logic is to execute at least one operation that is forbidden by the access control policy, and to create at least one predetermined observable side effect based on the successful execution of the operation.

An example method 100 for determining whether an intrusion in a software target has occurred or not is shown in the block diagram of FIG. 1. A software target which may be a main logic, an execution environment of a main logic, or both, is monitored at block 102. The software target may have an access control policy. The example method 100 further comprises monitoring the behavior of the software target with, e.g., an external monitor. However, the example method 100 may further comprise monitoring the integrity of the isolation mechanisms of the software target by actively and continuously verifying whether its current access control policy enforcement is in conformity with the originally intended access control policy.

To do so, a probing logic, e.g. a piece of extra code, is used at block 104. The probing logic may be in the same execution environment as the potentially vulnerable code, e.g. the main logic. The probing logic is to actively test the access control policy.

In the example method 100, the probing logic actively tests the access control policy by trying to execute an operation that is forbidden by a properly configured and enforcing access control mechanism at block 105. For example, the probing logic may try to modify the permissions of a file, try to execute a system call, try to send packets to an IP address, try to write to a file, try to create processes, try to modify some values inside the main logic memory, or the like.

At block 106, at least one predetermined observable side effect is created by the probing logic based on the successful execution of the forbidden operation (see block 105). This side effect can then be monitored by the monitor at block 108 to determine, at block 110, whether an intrusion has occurred or not.

For example, the probing logic may create an observable side effect by successfully executing an operation which is forbidden by the access control policy of the software target. An observation of this side effect by the monitor may then indicate that the access control policy has been compromised by an intrusion. In another example, the probing logic may create a predetermined side effect when the access control policy is not compromised, i.e. when there is no intrusion. In this case, a non-observation of this side effect by the monitor may then indicate that the access control policy has been compromised by an intrusion. In further examples, there may be first predetermined side effects which are to be created when the probing logic's requests result in failure, i.e. when no intrusion occurred, and second, different, predetermined side effects that are to be created when the probing logic's requests succeed, i.e. when the access control policy is compromised. A non-observation of the first side effects and/or an observation of the second side effects may then indicate that an intrusion occurred.

The side effects to be monitored are predetermined, i.e. they are known in advance, which makes it easier for the monitor detect them. In some examples, the probing logic may create one predetermined side effect. For example, the probing logic may create the side effect when it successfully executes an operation which is forbidden by the access control policy, i.e. when an intrusion in the software target occurred. In some examples, the probing logic may create the side effect when the request to execute a forbidden operation results in failure, i.e. when no intrusion occurred. However, the probing logic may also create a number of different side effects based on the occurrence or non-occurrence of an intrusion.

Examples for side effects that may be created by the probing logic include, but are not limited to, accessing a file or directory, creating or writing to a file, e.g. a, deleting a specific piece of data or code in the software target or in another execution environment, creating network traffic, executing a system call, or blocking one of an IP address, a protocol or a port.

In some examples, the probing logic's memory may not contain a specific piece of data originally stored in another execution environment. In some examples, a specific file in another execution environment has been created or written to by the probing logic. In some examples, the parent execution environment does not contain a specific injected code. In some examples, a specific memory area of another execution environment does not contain a specific value. In some examples, the probing logic reports of success or failure of the probing operations. In some examples, the probing logic may modify the access privileges of a specific file, i.e. enable to read or write to a file, which would not have been accessible under the original access control policy. In some examples, the unauthorized execution of a system call may be successful. In some examples, the probing logic may successfully send data packets to a specific IP address. In some examples, the probing logic may modify a specific file in a specific way. In some examples, the probing logic may implement new processes in the execution environment. In some examples, the probing logic may modify or add some code in the main logic.

A side effect is then monitored at block 108. As explained above, the monitor knows what side effects to look for, since the side effects have been predetermined, i.e. they are known in advance. In some examples, the monitor may continuously look out for the predetermined side effects in the software target. In some examples, the monitor may monitor side effects in regular or irregular intervals. In some examples, the monitor may monitor side effects based on the occurrence or absence of a specific event.

For example, the monitor may look whether a specific file or directory has been accessed, or whether a specific file has been created or written to. For example, the monitor may look whether a specific piece of data or code in the software target or in another execution environment has been deleted. The monitor may also look whether specific network traffic has been created, or whether an unauthorized system call has been executed, or whether one of an IP address, a protocol or a port has been blocked.

Based on the monitored side effects, it is then determined whether an intrusion has occurred at block 110. In some examples, the observation of a specific side effect may indicate that an intrusion has occurred (block 110a). In other examples, the observation of a specific side effect may indicate that no intrusion occurred (block 110b) However, in some examples, a number of different side effects may be monitored. The observation or non-observation of some predetermined side effects may then indicate that an intrusion has occurred, or not, respectively (cf. blocks 110a, 110b).

In some examples, the monitored side effects and/or the result of the determination whether an intrusion has occurred or not may be reported, e.g. to a user or an administrator, or written to a log file, or the like. In some examples, responsive actions may be taken to remove the intrusion, or to repair the system or the access control policy. For example, the Operating System (OS) may be reinstalled, or user data may be recovered, e.g. from backup memory such as backup storage or a cloud.

Figure 2:
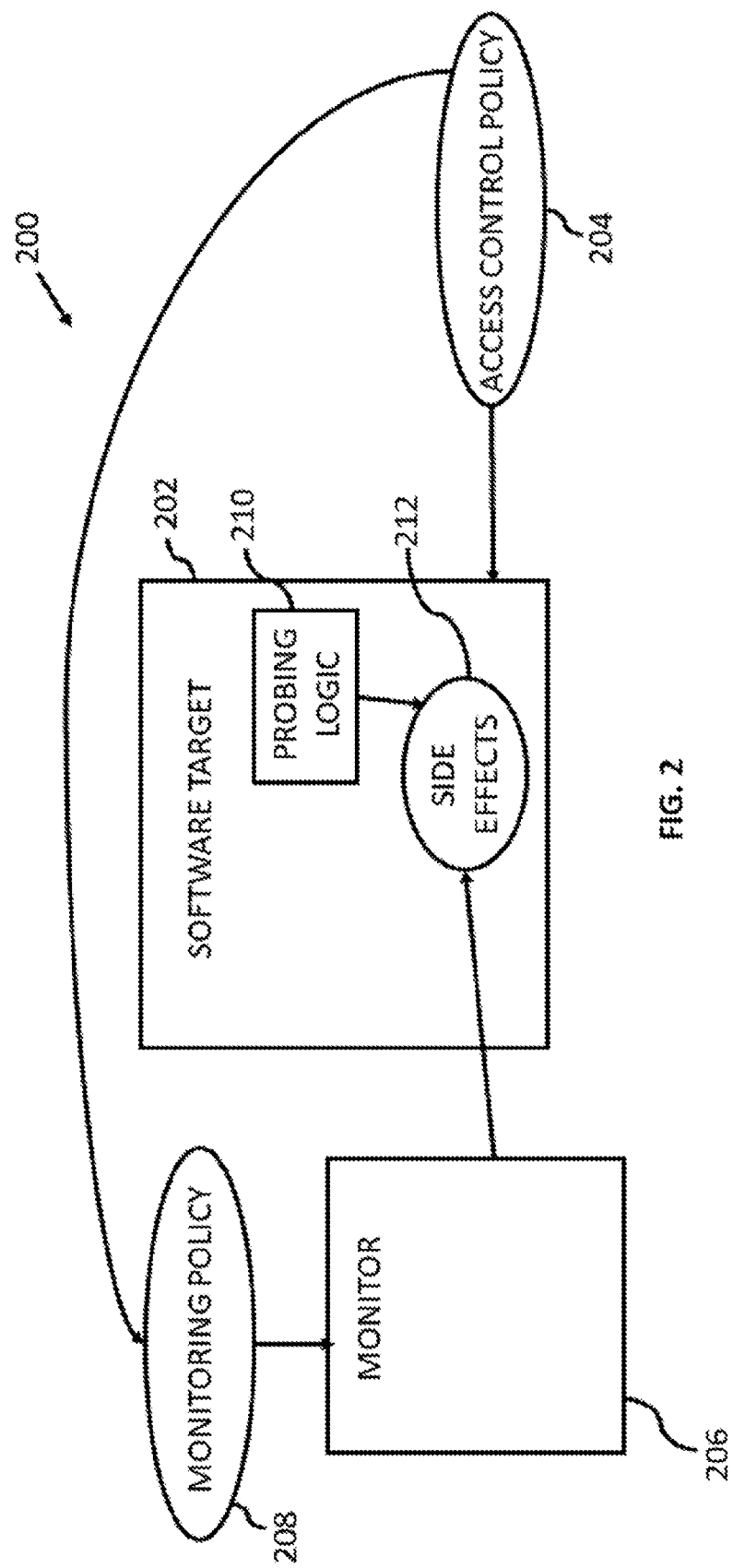
FIG. 2 is a schematic view of an example system for actively testing an access control policy.

An example system 200 is shown in FIG. 2. The system 200 comprises a software target 202 having an access control policy 204. The example system 200 further comprises a monitor 206, e.g. an external monitor, having a monitoring policy 208. The example system 200 further comprises a probing logic 210. The probing logic 210 is to actively test the access control policy 204. For example, the probing logic 210 may try to execute an operation which is forbidden by the access control policy 204. Based on the successful execution of the operation, the probing logic 210 will create a predetermined observable side effect 212. The monitor 206 observes the software target. For example, the monitor 206 may observe the behavior of the software target. However, the monitor 206 will also look for the predetermined side effect 212. Since the side effect 212 is predetermined, the monitor 206 knows what side effect to look for. The example system 200 may determine whether an intrusion has occurred or not based on the monitored side effect 212. In some example systems 200, the probing logic 210 may create a number of different predetermined side effects 212 which are then detected by the monitor 206.

Figure 3:
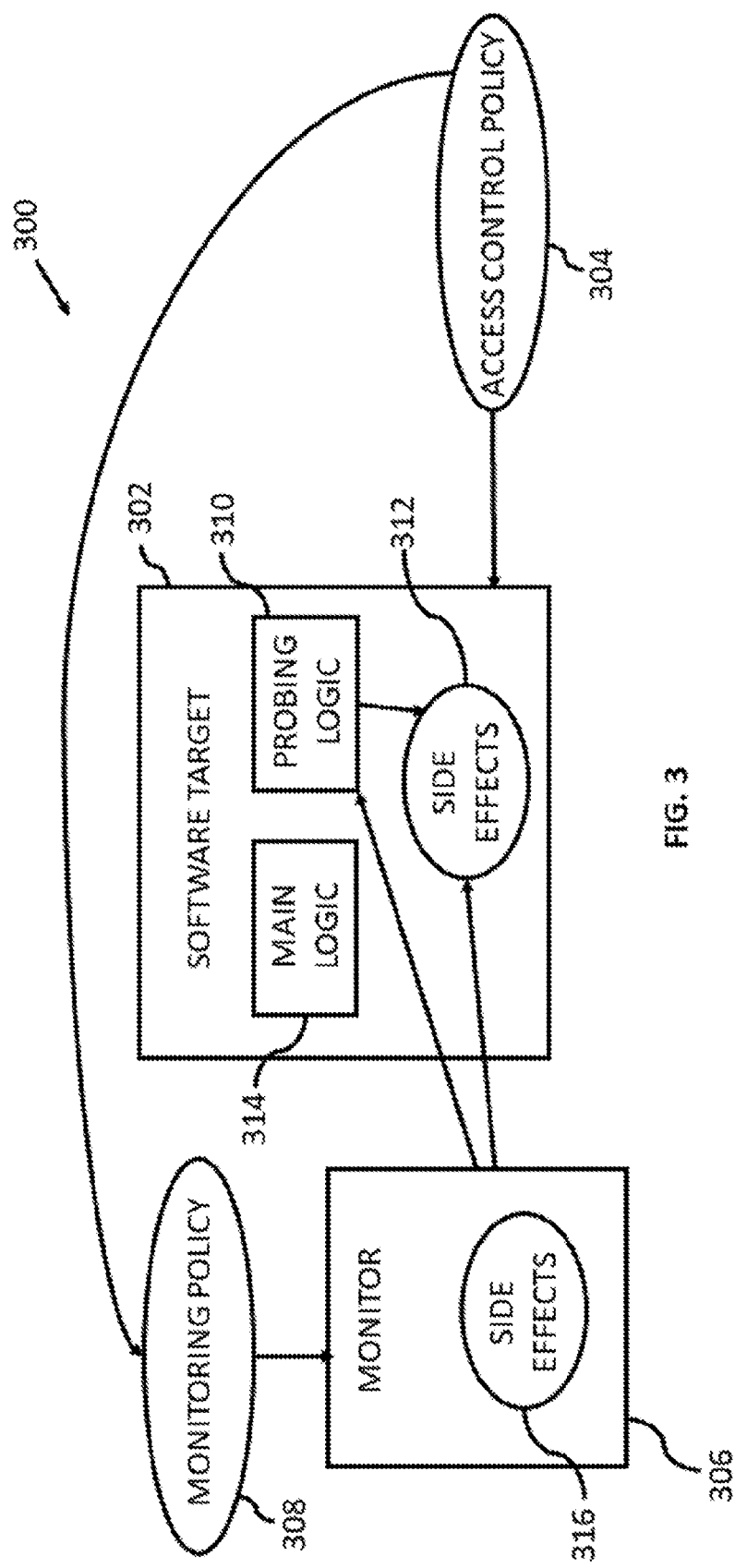
FIG. 3 illustrates a further example of a system for actively testing an access control policy.

As shown in FIG. 3, the software target 302 of the example system 300 may be a main logic 314, an execution environment, such as e.g. a virtual machine (VM), a container or a process, or both. In the example of FIG. 3, the monitoring policy 308 specifies at least one observable side effect 316, which the probing logic 310 is to create. For example, an observable side effect 316 may be specified, i.e. predetermined, in the monitoring policy 308 and provided to the probing logic 310. The probing logic 310 will try to execute an operation which is forbidden by the access control policy 304. Based on the successful execution of this operation, the probing logic 310 will create predetermined observable side effects 312, at least the side effect 316 specified in the monitoring policy 308. The monitor 306 having the monitoring policy 308 observes the software target 302 and looks, for example, for the side effect 316. The example system 300 then determines whether an intrusion has occurred or not based on the monitored side effect 312, 316. In some examples, one side effect 316 may be specified in the monitoring policy 308. In other examples, a number of different side effects 316 may be specified in the monitoring policy 308.

Figure 4:
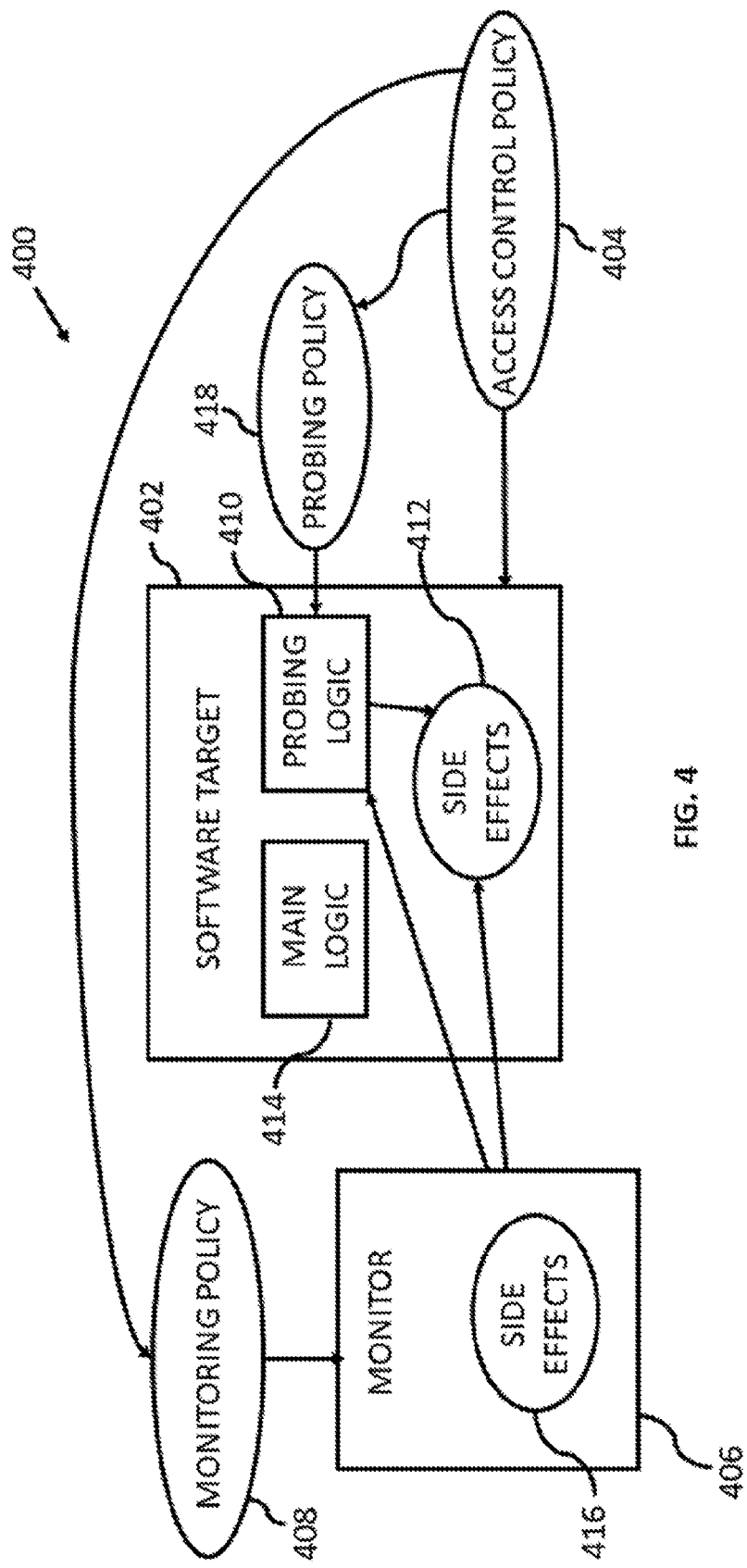
FIG. 4 illustrates a further example of a system for actively testing an access control policy.

The example system 400 shown in FIG. 4 further comprises a probing policy 418, which specifies the operation that is to be executed by the probing logic 410.

Figure 5:
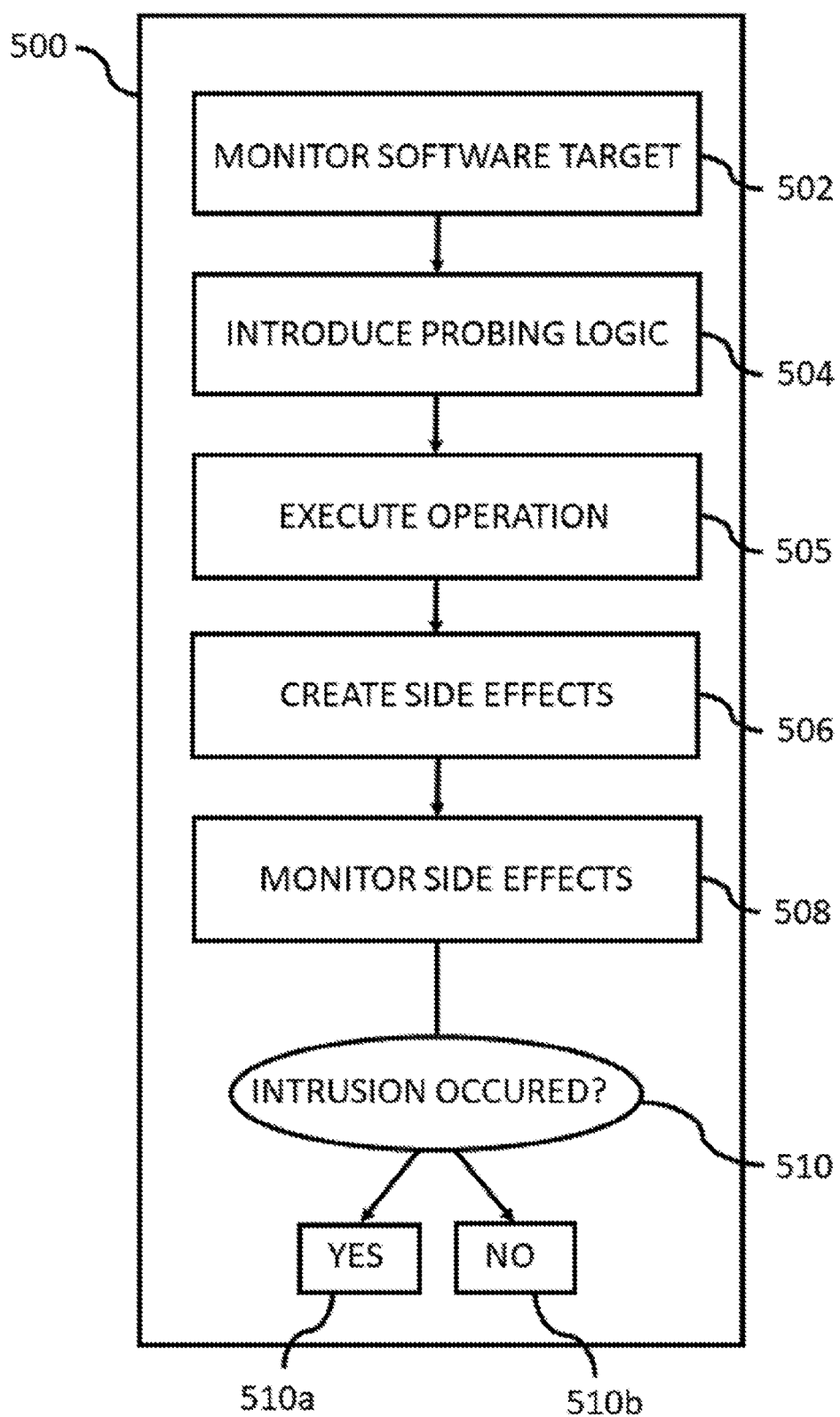
FIG. 5 shows a program product having computer readable code stored thereon, according to one example.

An example non-transitory program product 500 is illustrated in FIG. 5. The example program product 500 has computer readable code stored thereon. When executed by a computing device, the example computer readable code causes a computing device to monitor a software target at block 502. The software target may have an access control policy. The computer readable code further causes the computing device to introduce a probing logic into the software target at block 504. The probing logic is to actively test the access control policy. For example, the probing logic may try to execute an operation that is forbidden by the access control policy at block 505. Based on the successful execution of this operation, the probing logic will create predetermined observable side effects at block 506. Furthermore, the computer readable code stored on the example program product 500 causes the computing device to determine whether an intrusion in the software target has occurred based on monitored side effects at block 510.

The invention claimed is:

1. A method, comprising:
   introducing a probing logic into a software target,
   actively testing the access control policy of the software target using the probing logic, and
   determining whether an intrusion in the software target has occurred based on monitored side effects,
   wherein the probing logic is to execute at least one operation that is forbidden by the access control policy, and to create at least one predetermined observable side effect based on the successful execution of the operation.

2. The method of claim 1, wherein the software target is one of a main logic and an execution environment of the main logic.

3. The method of claim 2, wherein the execution environment is one of a virtual machine, a container and a process.

4. The method of claim 1, wherein the probing logic is to create a number of predetermined side effects comprising at least one of accessing a file or directory, creating or writing to a file, deleting a specific file or directory, deleting a specific piece of data or code in the software target or in another execution environment, creating network traffic, executing a system call, or blocking or unblocking one of an IP address, a protocol or a port.

5. The method of claim 1, wherein a monitoring policy specifies the at least one observable side effect.

6. The method of claim 5, wherein the monitoring policy further specifies at least one responsive action to take when it is determined that an intrusion has occurred.

7. The method of claim 1, wherein a probing policy specifies the at least one operation that is to be executed by the probing logic.

8. A system, comprising:
   a software target having an access control policy,
   a monitor having a monitoring policy, and
   a probing logic to actively test the access control policy,
   wherein the probing logic is introduced into the software target,
   wherein the probing logic is to execute at least one operation that is forbidden by the access control policy, and to create at least one predetermined observable side effect based on the successful execution of the operation, and
   wherein the system is to determine whether an intrusion in the software target has occurred based on monitored side effects.

9. The system of claim 8, wherein the software target is one of a main logic and an execution environment of the main logic.

10. The system of claim 9, wherein the execution environment is one of a virtual machine, a container and a process.

11. The system of claim 8, wherein the probing logic is to create a number of predetermined side effects comprising at least one of accessing a file or directory, creating a file, deleting a specific piece of data or code in the software target or in another execution environment, creating network traffic, executing a system call, or blocking one of an IP address, a protocol or a port.

12. The system of claim 8, wherein the monitoring policy specifies the at least one observable side effect.

13. The system of claim 8, wherein the monitoring policy further specifies at least one responsive action to take when it is determined that an intrusion has occurred.

14. The system of claim 8, further comprising a probing policy which specifies the at least one operation that is to be executed by the probing logic.

15. A non-transitory program product having computer readable code stored thereon that, when executed by a computing device, causes the computing device to:
   introduce a probing logic into a software target, and
   determine whether an access control policy of the software target has been compromised using the probing logic,
   wherein the probing logic is to execute at least one operation that is forbidden by the access control policy, and to create at least one predetermined observable side effect based on the successful execution of the operation, and wherein the computing device determines whether the access control policy has been compromised based on monitored side effects.

* * * * *